N° 50,500

C. Schultz & Thos. Warker's Impd Gaseous Liquid Injector.
Patented Oct. 17, 1865.

Witnesses:
James R. Mason
Edwd. H. Warker

Inventors:
Carl Schultz
Thomas Warker

UNITED STATES PATENT OFFICE.

CARL SCHULTZ AND THOMAS WARKER, OF NEW YORK, N. Y.

IMPROVEMENT IN GASEOUS-LIQUID INJECTORS.

Specification forming part of Letters Patent No. 50,500, dated October 17, 1865; antedated October 4, 1865.

*To all whom it may concern:*

Be it known that we, CARL SCHULTZ and THOMAS WARKER, of No. 133 Fourth Avenue, in the city, county, and State of New York, have invented a new and Improved Gaseous-Liquid Injector; and we do hereby declare that the following is a full, clear, and exact description thereof, which will enable others skilled in the art to make and use the same, reference being had to the accompanying drawings, forming part of this specification, in which—

Figure 1:
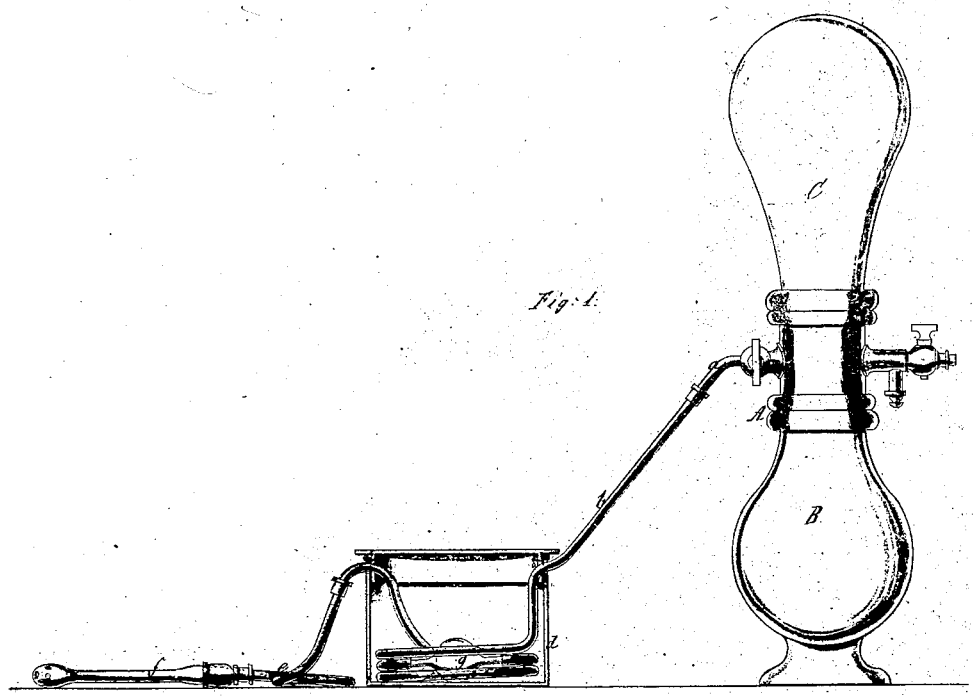
Figure 2:
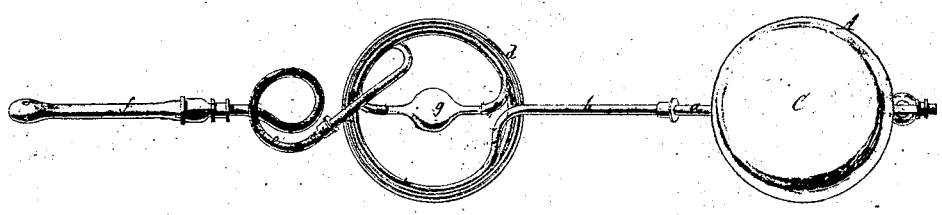

Figure 1 is a sectional side elevation of this invention. Fig. 2 is a sectional plan or top view of the same.

Similar letters of reference indicate like parts.

The object of this invention is to heat carbonic-acid water or other gaseous liquids and to use them in this heated or warm state as injections or for medical purposes.

The invention consists in interposing between the vessel containing the gaseous liquid and the discharge spout or tip a coil of pipe, situated in a vessel which is partially or wholly filled with hot water, in such a manner that the gaseous liquid, while passing through this coil, is heated to the desired temperature, and the escape or loss of a portion of the gases is avoided.

The invention consists, further, in the use of a bulb of glass or other suitable material, provided with an inlet and outlet tube, and applied in combination with the fountain containing the gaseous liquid, and with the pipe passing through hot water, in such a manner that the heated liquid, in passing through said bulb, will discharge a portion of its gases which accumulates in the upper part of the same, and when the pressure of those gases exceeds that of the liquid nothing but gas will discharge from the bulb; but as soon as the pressure of the gas is reduced the liquid will rise in the bulb, and only liquid divested of a portion of its gases will discharge, and thus an alternate jet of liquid and of gas is obtained.

A represents an apparatus in which carbonic-acid water or other gaseous liquid can be made, and which is composed of the generator B and receiver C; but, instead of this apparatus, any vessel which is charged with the gaseous liquid and provided with a suitable discharge-tube can be used in the operation.

The discharge-tube *a* of the fountain C connects with a pipe, *b*, of metal or of some flexible material, such as india-rubber; and this pipe forms a coil, *c*, which is situated in a vessel, *d*, and which connects by means of a flexible or rigid tube, *e*, with the discharge spout or tip *f*. The form of this tip changes according to the spot where the injector is to be applied, and it is secured to the pipe *e* by means of a screw-thread, so that it can be readily removed and replaced by another of different shape.

Interposed between the pipe which forms the coil *c* is the bulb *g*, of glass or any other suitable material. This bulb is provided with two openings—one to admit the liquid and the other to discharge the same—and when the apparatus is in use it is covered by warm or hot water. It is so connected to the coil that it can be taken out or put in in a short time. When the bulb is not used the gaseous liquid from the fountain C passes through the coil, which is covered by hot water, and in its passage through said coil the liquid is heated; but the tube which forms the coil, being completely filled with liquid, does not allow the gases to separate themselves from the liquid, and an injection can thus be taken of hot carbonic-acid water or other gaseous liquid. Such an injector has been heretofore considered an impossibility, because, in heating the carbonic-acid water or other gaseous liquid in any other manner but that above stated, the gases escape from the liquid, and the patient derives no benefit from the same.

In many cases it may be desirable to obtain an alternate jet of liquid and of carbonic-acid or other gas, and in such cases the bulb *g* is used. As the gaseous liquid passes through this bulb, which is covered with hot water, as previously stated, the carbonic-acid or other gas or gases free themselves from the liquid and occupy the upper portion of said bulb. The pressure of the gases thus inclosed rises until the liquid is forced back from the discharge-opening and a portion of the gases from the upper part of the bulb discharges. As soon as the pressure of said gases is reduced by this escape the liquid rises in the bulb and a jet of liquid discharges from the spout, and by these means alternate jets of liquid and of gases are obtained, which in many cases is considered of great importance.

We claim as new and desire to secure by Letters Patent—

1. Combining with a fountain containing carbonic-acid water or other gaseous liquid a heater composed of a coil of pipe situated in a vessel filled with hot water, or constructed in any other suitable manner, substantially as herein set forth, so that a hot injection of such gaseous liquid can be obtained without allowing the escape of gas.

2. The application of a bulb, $g$, in combination with the coil $c$, vessel $d$, fountain A, and tip $f$, constructed and operating substantially as and for the purpose described.

CARL SCHULTZ.
THOMAS WARKER.

Witnesses:
JAMES R. MASON,
EDWD. H. WARKER.